United States Patent [19]

Souza et al.

[11] 4,250,654
[45] Feb. 17, 1981

[54] ROTATING FRAME ANIMAL TRAP

[75] Inventors: Anthony J. Souza, Lancaster; William E. Askins, Lititz, both of Pa.

[73] Assignee: Woodstream Corporation, Lititz, Pa.

[21] Appl. No.: 33,238

[22] Filed: Apr. 25, 1979

[51] Int. Cl.³ .......................................... A01M 23/26
[52] U.S. Cl. ............................................. 43/90; 43/88
[58] Field of Search ............................... 43/90, 92, 88

[56] References Cited

U.S. PATENT DOCUMENTS

| | | | |
|---|---|---|---|
| 2,564,811 | 8/1951 | Mau | 43/90 |
| 2,701,428 | 2/1955 | Mau | 43/90 |
| 2,947,107 | 8/1960 | Lehn | 43/92 |
| 3,010,245 | 11/1961 | Conibear | 43/92 |
| 3,146,545 | 9/1964 | Frost | 43/92 |
| 3,421,251 | 1/1969 | Hofmeister | 43/92 |
| 3,991,509 | 11/1976 | Frost | 43/90 |
| 4,117,623 | 10/1978 | Conibear | 43/90 |
| 4,128,961 | 12/1978 | Conibear | 43/90 |

Primary Examiner—Othell M. Simpson
Assistant Examiner—J. T. Zatarga
Attorney, Agent, or Firm—Holman & Stern

[57] ABSTRACT

A rotating frame animal trap has a specific form of frame design for insuring that the maximum clamping force between the jaws is developed at a jaw opening which corresponds to the dimension of a target animal. This frame design also produces generally increased clamping forces compared with known traps over a range of jaw openings smaller than the target opening.

5 Claims, 3 Drawing Figures

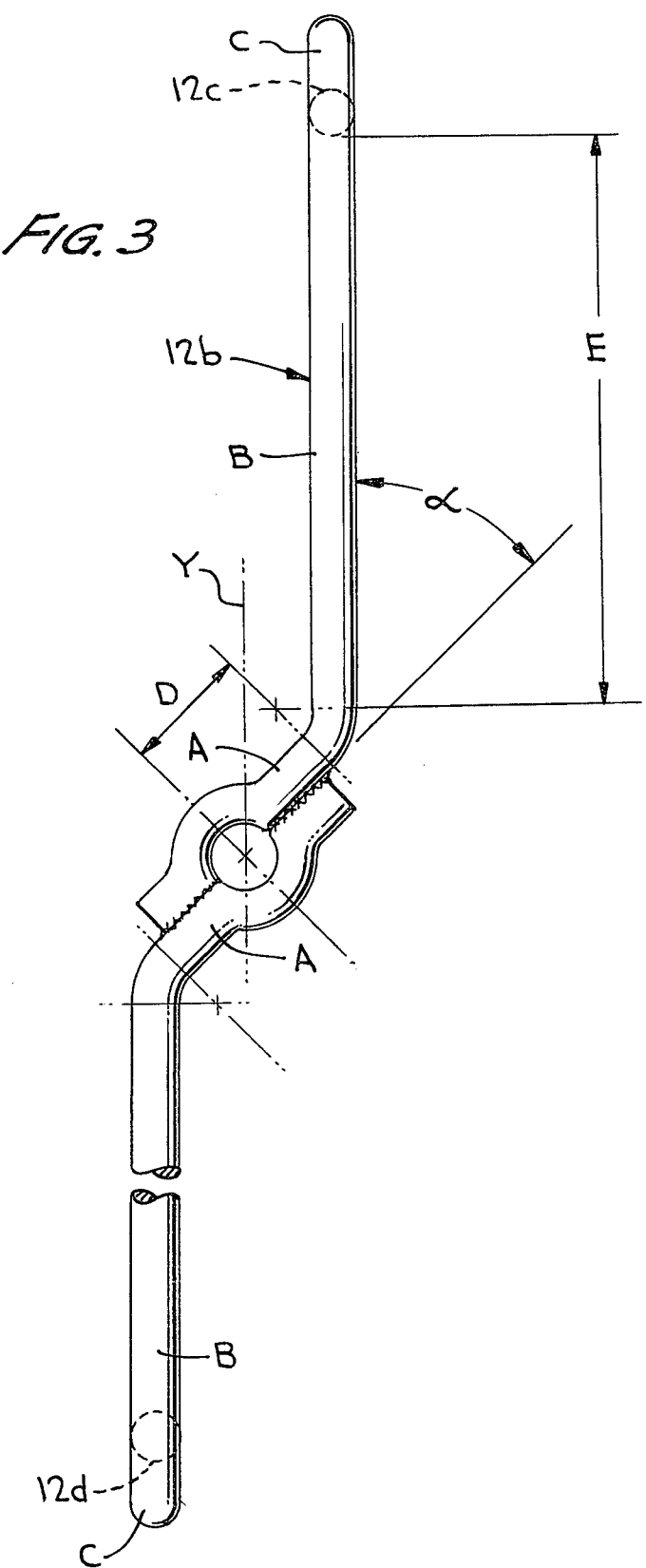

ROTATING FRAME ANIMAL TRAP

BACKGROUND OF THE INVENTION

This invention relates to rotating frame animal traps of the type comprising a pair of similar frames pivotally connected at adjacent ends for relative rotation about a common axis and forming at their sides two pairs of co-acting jaws.

Such traps are conventionally provided with at least one actuator in the form of a pair of arms urged apart by a coil spring, each arm terminating in an actuator ring which encircles one set of adjacent ends of the frames and urges the jaws towards a closed position. To set the trap, the actuator arms are pressed towards each other against the spring action and the frames are relatively rotated to open the jaws. In the open position of the trap adjacent jaw forming sides of the respective frames are held in close proximity by a trigger and latch means and the frames themselves serve to hold the actuator rings against the spring force in positions adjacent and on opposite sides of one of the frame pivots.

When the trap is sprung, through movement of the trigger means by a target animal, the frames are released, allowing the actuator rings rapidly to move out along the encircled frame ends and force the trap jaws towards one another.

The extent to which the jaws can close on one another (the ultimate jaw opening) depends on the size of an animal trapped between the jaws. This size can vary considerably and different size traps are generally provided to trap different species and sizes of target animals.

Further, it is desirable for such traps to operate in as efficient and humane a manner as possible. This implies that the maximum force available from the trap should be brought to bear on the animal at the moment of impact of the jaws and immediately thereafter so that the animal can be killed as rapidly as possible.

It is an object of the present invention in an animal trap of the type described, to provide means whereby the optimum available force of the trap can be brought to bear on a target animal at and subsequent to the moment of impact of the trap jaws with the animal.

It is a further object of the invention to provide an animal trap of the rotating frame type which provides an increased impact force and increased holding power subsequent to impact compared with comparably sized prior art traps.

A further object of the invention is to provide a rotating frame animal trap having increased holding power compared with similar prior art traps at relatively small jaw openings.

It is a still further object of the invention to provide a rotating frame animal trap having a novel form of frame design which significantly improves the trap performance compared with comparable prior art traps particularly in regard to increased holding power at the point of impact with the target animal and subsequently thereto.

SUMMARY OF THE INVENTION

In rotating frame animal traps as described, it is recognized that the force exerted on the trap jaws changes continuously as the actuator rings move out along the frame ends towards their terminal positions at or near the junctions of the frame ends and the jaw forming side frames. From tests conducted on prior art traps, applicant has found that this force rises to a maximum as the actuator rings move out along the frame ends and then drops away as the rings approach the ends of their travel and the jaw opening decreases. Further, in such traps, which are generally designed to trap animals of a particular size range, the point of maximum force does not necessarily correspond with the jaw opening at which impact will take place with the target animal.

The present invention is based on the principle of designing a rotatable frame animal trap to catch a specific size range of animal and arranging for the point of maximum trap force to occur substantially at the jaw opening at which impact will take place with the target animal.

The force which a trap develops at any given point in the travel of the actuator rings along the frame ends is dependent on a number of factors such as the power of the actuator spring, the diameter and shape of the actuator rings, the distance of the rings from the frame pivot point and the frame design and general geometry. In accordance with the invention, these factors are utilized to provide the trap with the required force characteristics over the range of movement of the actuator rings. In particular, the invention is concerned with improving the frame design of the trap to obtain improved performance compared with known traps of similar size equipped with similar actuator mechanisms.

More specifically, therefore, the invention provides a particular form of frame design for a rotatable frame animal trap which results in optimum jaw force being exerted at the jaw opening corresponding to the point of impact of the jaws with a particular size range of target animal and which also increases the holding power of the jaws at least over relatively small jaw openings, subsequent to impact, compared with known traps using a similar actuator mechanism.

Tests conducted with traps having frames designed in accordance with the instant invention indicate improved force characteristics at the required jaw openings compared with prior art traps of comparable size equipped with similar actuator mechanisms. The traps made in accordance with the invention not only improve the location at which peak jaw force is exerted (substantially to correspond with the point of impact with the target animal) but also provide increased peak force and increased holding force subsequent to impact than the prior art traps. In other words, the inventive traps provide increased jaw force at smaller jaw openings than the conventional traps so that the holding power is increased subsequent to impact with target animals within the particular trap's designed size range and the traps further offer improved holding power for undersize animals due to the increased jaw force at the smaller trap openings.

DESCRIPTION OF PREFERRED EMBODIMENTS

In common with conventional rotating frame animal traps, the illustrated trap comprises a pair of generally rectangular frames 10, 12 of like configuration having ends 10a, 10b, 12a, 12b and jaw forming sides 10c, 10d, 12c, 12d. As shown, adjacent ends of the respective frames are pivotally interconnected at their mid-points for mutual rotation of the frames about an axis substantially perpendicular to the frame ends.

Figure 1:
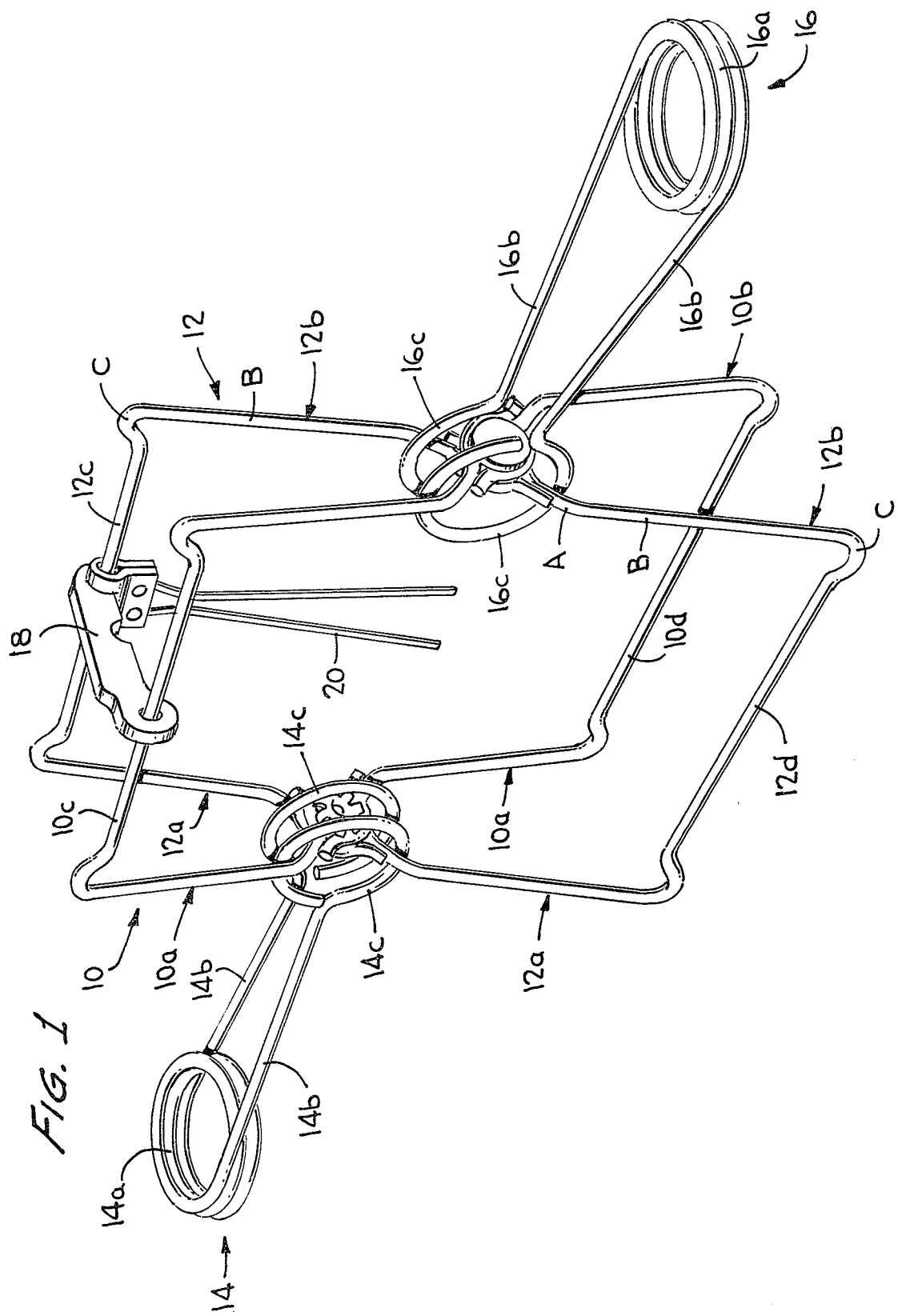
FIG. 1 is a perspective view of a rotating frame trap made in accordance with the invention shown in the set position.

The trap is provided at its opposite ends with actuators 14, 16 respectively, each actuator comprising a coil spring 14a, 16a and pairs of arms 14b, 16b urged apart by the spring, the arms terminating in actuator rings 14c, 16c which encircle the adjacent ends of the trap frame as shown on opposite sides of the pivots. A dog-type catch 18 is pivotally mounted on jaw forming side 10c of frame 10 for engagement with jaw forming side 12c of frame 12 to hold the trap in set position (FIG. 1) and jaw forming side 12c carries a conventional pivotally mounted trigger 20 for releasing the catch when the trigger is moved by an animal so as to spring the trap.

To set the trap, the actuator arms are pressed together against the action of their respective springs and the frames are relatively rotated to bring jaw forming side 10c into proximity with jaw forming side 12c. (A setting tool may be used if required.) Catch 18 is engaged and in this position it will be seen that the ends of the respective frames (held against movement by catch 18) themselves hold the actuator rings together against the action of their respective springs.

When the catch is released by movement of trigger 20, the frames are free to rotate and springs 14a, 16a cause the actuator rings rapidly to spread apart thereby forcing the respective trap jaws together, jaw forming sides 10c and 12d defining one trap jaw and jaw forming sides 12c and 10d defining the other trap jaw.

Figure 2:
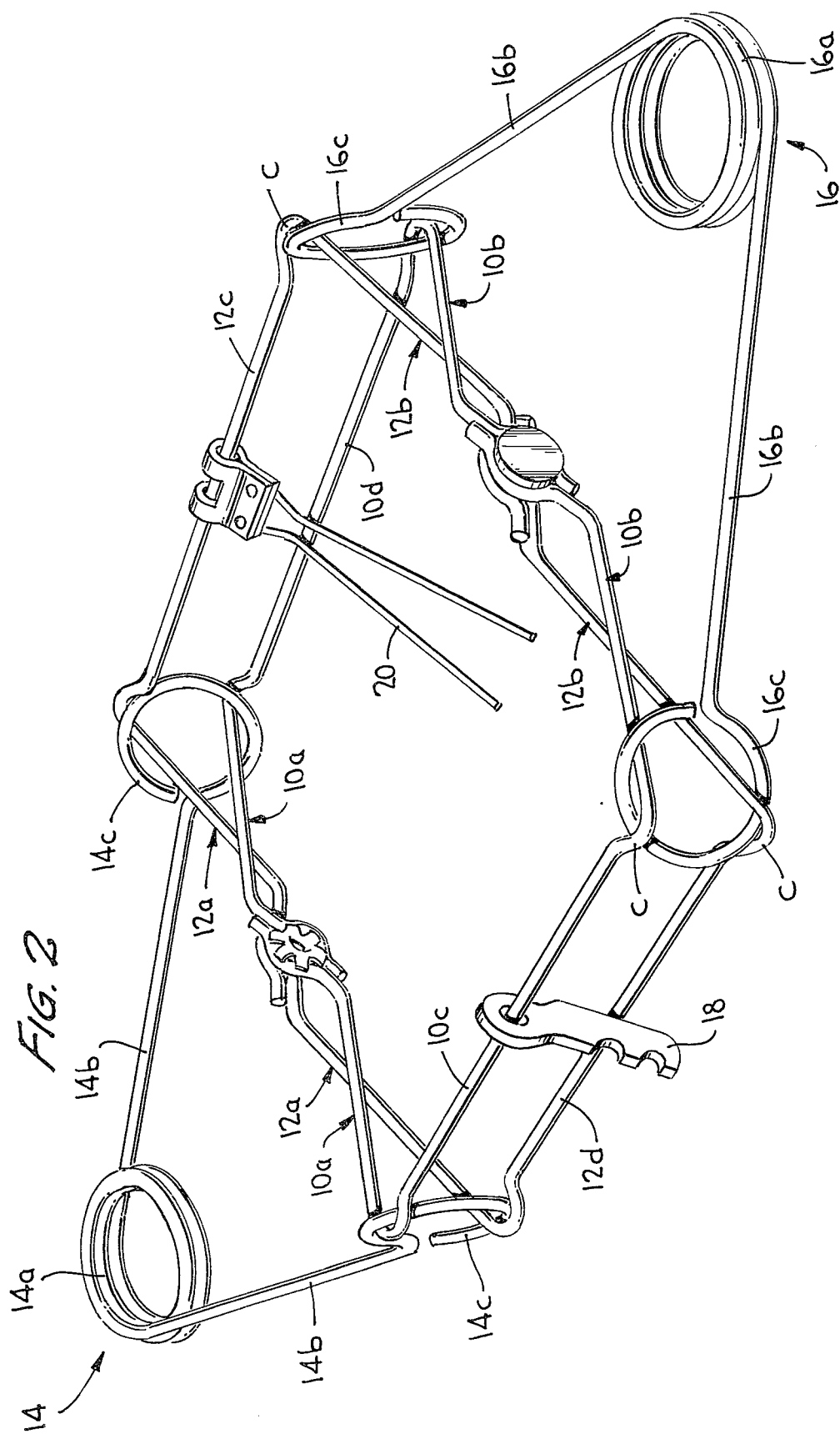
FIG. 2 is a view similar to FIG. 1 with the trap shown in the sprung position and, FIG. 3 is an end view of one of the frames of the trap.

If the space between the jaws was unobstructed, the trap when sprung would assume substantially the position shown in FIG. 2. In use, however, a target animal's body will be present between the jaws so that the jaws will not be able to close completely. As indicated, traps are generally designed to catch a particular size range of target animal. Impact with the animal will accordingly occur (within limits due to slight variations in size of animals of a particular species) when the trap jaws are at a certain predetermined distance apart (referred to as the "target opening") and the jaws will then close further to a degree dependent on the jaw force and the compressibility of the animal.

In accordance with the present invention, the trap frames are designed in a specific manner so that when the trap closes, the jaw force will be at its peak substantially at the time the jaws reach the target opening and further so that this force and the jaw force at openings smaller than the target opening is substantially increased compared with known traps of the same size equipped with like actuators.

The novel design of trap frame of the present invention is best illustrated in FIG. 3 which is an end view on frame end 12b of frame 12. It will be appreciated that frame ends 12a, 10a and 10b are all of like form. As shown in FIG. 3, each frame end is symmetrical about the pivot point and comprises a pair of substantially linear inner arm portions A and a pair of substantially linear outer arm portions B, the outer arm portions being extended beyond the respective jaw forming sides 12c and 12d by loop sections C which join the ends to the sides of the frames. The inner arm portions are disposed on opposite sides of an axis X passing through the pivot point and the outer arm portions are likewise disposed on opposite sides of an axis Y passing through the pivot. The outer arm portions make an angle $\alpha$ with the respective inner arm portions which it has been found should be in the range $\pm 45°$ to $\pm 55°$ and the ratio of length of the outer arm portion E to the inner arm portions D should be in the range $\pm 4.75:1$ to $\pm 2.65:1$.

The purpose of the loop sections C is to enable the actuator rings to travel the maximum possible distance and operate with the maximum amount of leverage at small jaw openings and also to prevent the rings from "turning the corner" and moving along the jaw forming sides of the frame.

It has been found that by providing the frame ends of the trap with characteristics as set out above, the values for jaw forces as the actuator rings move along the frame ends are significantly improved compared with known frame designs. In particular, the relationship between the various parameters permits the peak force of the jaws to be exerted substantially at the required target opening of the trap and further, the force of the jaws is increased compared with known traps for jaw openings smaller than the target opening.

Examples of three different size traps made in accordance with the invention are given below.

EXAMPLE 1

Three different models of a trap particularly directed to trapping animals having a girth of approximately 2½ inches to 3 inches diameter were manufactured with a frame design as illustrated. In this case, the inner arm portions A were made 0.875 inches long, the outer arm portions 4.136 inches long (i.e., a ratio E:D of 4.73:1) and angle $\alpha$ was 45°.

The traps were tested against the known prior art form of trap having a frame shape substantially as shown in U.S. Pat. No. 2,947,107 to Lehn issued Aug. 2, 1960 or in U.S. Pat. No. 3,010,245 to Conibear issued Nov. 28, 1961. The trap frames were made from similar bar stock, had like overall dimensions and utilized like actuators. The results of the tests are shown in Table 1 (two tests being shown for each of the three new traps) and the figures represent measured jaw pressure in pounds for a range of jaw openings, the pressure being measured on a test piece of the required size placed between the jaws.

It will be seen from the table that with the prior art form of trap, peak pressure was 120 pounds at an opening of 3 inches whereas with traps having the present frame design, peak pressure varied between 200 and 175 pounds. Further, peak pressure was consistently developed in the 2½ inch to 3 inch opening range, i.e. the target opening range. Also over the entire range of openings tested, the pressures were consistently higher than for the known type of trap.

TABLE I

| Jaw Opening | Prior Art Trap | Trap #1 | | Trap #2 | | Trap #3 | |
|---|---|---|---|---|---|---|---|
| 4" | 105 | 155 | 160 | 140 | 140 | 145 | 140 |
| 3½" | 115 | 170 | 170 | 150 | 155 | 155 | 155 |
| 3" | 120 | 200 | 195 | 165 | 165 | 175 | 175 |
| 2½" | 110 | 155 | 150 | 175 | 175 | 185 | 180 |
| 2" | 80 | 110 | 110 | 125 | 130 | 130 | 130 |
| 1½" | 0 | 25 | 30 | 45 | 50 | 50 | 55 |

EXAMPLE 2

In this case, three different models of a trap particularly directed to trapping animals having a girth of approximately 1½ inches to 2 inches diameter were manufactured according to the design described above. The inner arm portions A were 1.03 inches long, the outer arm portions B were 2.785 inches long, giving an E:D ratio of 2.70:1 and angle α was 45°.

Two tests were again run on each trap at different jaw openings and the jaw force measured in each case. For comparison purposes a similar test was again conducted on a known trap of like dimensions having a frame design as shown in the above patents. The results of these tests are listed in Table II from which it will be seen that the novel traps exhibited considerably improved pressure characteristics over the entire range of jaw openings and consistently developed peak pressure in the target opening range whereas the prior art traps developed peak pressure at 2½ inch opening.

TABLE II

| Jaw Opening | Prior Art Trap | Trap #1 | | Trap #2 | | Trap #3 | |
|---|---|---|---|---|---|---|---|
| 3" | 105 | 105 | 110 | 105 | 105 | 110 | 105 |
| 2¾" | 125 | 115 | 125 | 120 | 120 | 120 | 115 |
| 2½" | 140 | 130 | 135 | 130 | 130 | 135 | 128 |
| 2¼" | 130 | 145 | 150 | 135 | 145 | 150 | 140 |
| 2" | 110 | 160 | 160 | 155 | 160 | 165 | 155 |
| 1½" | 65 | 185 | 175 | 165 | 165 | 180 | 188 |
| 1" | 55 | 110 | 100 | 90 | 85 | 95 | 125 |

EXAMPLE 3

A trap particularly directed to trapping animals having a girth of approximately 1 inch diameter was manufactured in accordance with the invention, with in this case, inner arm portions A being 0.625 inches, outer arm portions B being 1.657 inches, giving a E:D ratio of 2.65:1 and angle α was 55°. The trap was again tested against a similar prior art trap and the results are shown in Table III. It will be seen that peak force was developed at the target opening of 1 inch and that at openings smaller than the target opening the forces developed were considerably greater than with the prior art trap.

TABLE III

| Jaw Opening | Prior Art Trap | Trap #1 |
|---|---|---|
| 1½" | 20 | 15 |
| 1¼" | 25 | 20 |
| 1" | 20 | 22 |
| ¾" | 15 | 20 |
| ½" | 0 | 10 |

While specific embodiments of the invention have been described in detail, it will be appreciated that the invention is not limited to the specific features of these embodiments. Numerous modifications are possible within the scope of the invention which is defined in the appended claims. For example, while the illustrated trap has been shown as having two like actuators, for small size traps it is possible for just a single actuator to be used.

The embodiment of the invention in which an exclusive property or privelage is claimed are defined as follows:

1. A trap for animals comprising two frames, each frame having first and second side members forming the jaws of the trap and having first and second end members joining together the side members, first pivot means connecting together the first end members of the two frames and second pivot means connecting together the second end members of the two frames such that the first end members and second end members are connected on a common axis so that the frames can pivot about said axis from an open position of the trap in which the first side member of one frame is closely adjacent and parallel to the first side member of the other frame to a closed position in which said first side member of said one frame is closely adjacent and parallel to the second side member of said other frame, each of the members consisting of two parallel non-collinear sections connected by a third section forming an angle in the range of ±45° to ±55° with each of said two parallel non-collinear sections, said end members being positioned to cross one another only at the common axis when the trap is open and closed, each of said parallel non-collinear sections being longer than the third section by a factor between 2.65 and 4.75, two ring members encircling said first end members one on either side of said first pivot means, each ring member being freely slidable along said end members and sized to bring together said end members in the closed position of the trap, spring means for urging apart the ring members toward the side members when the trap is being closed, and trigger means for maintaining the trap in open position against the action of the spring means and for releasing the trap to its closed position when triggered.

2. The trap according to claim 1 wherein said first and second side members in each frame are substantially parallel to one another and spaced by a distance which is less than the distance between remote ends of said two parallel non-collinear sections of said end members.

3. The trap according to claims 1 or 2 wherein each of said parallel non-collinear sections is 4.73 times as large as said third section of each end member, and wherein said angle is 45°.

4. The trap according to claims 1 or 2 wherein said parallel non-collinear sections of each end member are 2.70 times the length of said third section, and wherein said angle is 45°.

5. The trap according to claims 1 or 2 wherein said parallel non-collinear sections of each end member are greater than said third section by a factor of 2.65, and wherein said angle is 55°.

* * * * *